Sept. 9, 1969 R. G. BAUMGARTNER ET AL 3,466,380
UNDERGROUND DISTRIBUTION CLOSURE Filed July 12, 1967 2 Sheets-Sheet 1

INVENTORS: R.G. BAUMGARTNER
H. J. GRAFF
BY Charles E. Graves
ATTORNEY 3,466,380
UNDERGROUND DISTRIBUTION CLOSURE
Robert G. Baumgartner, Essex, and Harry J. Graff, Timonium, Md., assignors to Bell Telephone Laboratories, Incorporated, Murray Hill and Berkeley Heights, N.J., a corporation of New York
Filed July 12, 1967, Ser. No. 652,941
Int. Cl. H02g 9/02
U.S. Cl. 174—38     4 Claims

ABSTRACT OF THE DISCLOSURE

A cable splice closure consisting of a splice platform in a watertight bell jar is mounted for vertical movement between the mouth of a recessed well and its remote interior. The well mouth is installed flush with ground level and when lowered the bell jar top seats on the well rim.

---

This invention relates to cable closures and more specifically to underground telephone distribution closures.

Background of the invention

With today's increased emphasis on burying new telephone cable, wire and terminal points particularly in suburban areas, a significant need has arisen for fully functional underground distribution closures.

Underground closures are, in essence, protective housings for telephone cable access points. Various features of cable plant are located within these housings, such as splices between distribution cables and dropwire, terminated pairs, and electrical terminals. The protection which such cable access points require is against unauthorized entry, foreign matter, and particularly water since usually the closures are buried in porous soil. At the same time, however, the cables and terminals within the closure must be accessible to telephone workmen after the closure is installed.

In the above terms, known underground telephone distribution closures exhibit several disadvantages. For example, although the widely-used bell jars which cover the splice and terminal space are adequate water barriers when in place underground, removal of these jars to gain terminal access in some current designs is impossible without risking water entry. In others, removal must be preceded by extensive pumping of the closure. While pumping represents only added labor cost, water incursions on the terminals and splice points can cut off subscriber service.

Besides their water problems, however, many current closures fix the terminals in a location below ground level, making them difficult to work on. A few closure terminal supports are hinged to swing up above ground level once the bell jar is removed. In these closures, however, as the termial swings, the unsheathed insulated conductors connected to it flex; and with enough flexings the conductors can fail from fatigue.

Accordingly, one object of this invention is to eliminate all risk of water reaching the critical splice and terminal area of an underground distribution closure.

Another object of this invention is to eliminate the need for pumping out the main closure before exposing the terminals.

A further object of this invention is to avoid at all times exposing the terminals and splice points below ground level without protection.

Another object of this invention is to eliminate the flexing of unsheathed conductors in the operation of raising the terminals above ground to a working level.

Summary of the invention

These and other objects are achieved in accordance with this invention, broadly, by an underground closure in which a protective bell jar and the terminal space move in unison from a point recessed within the closure housing to a point well above ground. Neither the splices themselves nor the conductors flex in the process: instead, the cable itself provides the slack necessary to permit the vertical movement of terminal space and bell jar. Only when these are both above ground is the bell jar removed.

In one closure embodying the inventive concepts, the closure housing comprises an enclosed central well with two delta-shaped outstretching channels. The central well includes a vertical track to which a platform mounting the splice and terminal structure is engaged. The delta channels are extensions of the central well interior which intercept the cable at its buried depth and provide enclosures within which the cable can rise. The cable flexibility thus allows for vertical movement of the terminal space; and accordingly it becomes possible to keep the protective bell jar in place as the terminal platform is raised. As a result, no chance of water entering the terminal space exists either during routine operations on the closure or when the terminals are below ground.

The invention, its features and further objects thereof are further delineated in the detailed description to follow of an illustrative embodiment.

Detailed description of the drawings

Figure 1:
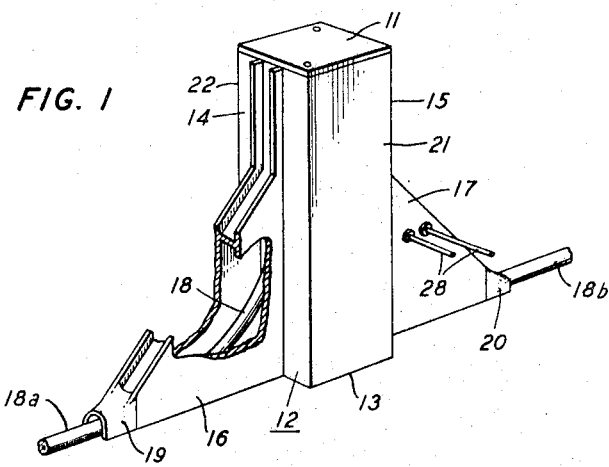
FIG. 1 is a side perspective view of the closure.

FIG. 1 shows an underground closure embodying the inventive concepts, comprising a top 11 and a main housing 12 defining a four-sided vertical interior well 13. Leading from opposite sides 14, 15 of housing 12 are two wing-like channels 16, 17, wide enough to loosely receive a cable 18. Their purpose, pursuant to the invention, is to form a protected, enclosed space of a vertical mode within which two sections of cable 18, namely sections 18a, 18b are loosely accommodated. Cable 18 is led into channel 16 through a boot 19 extending from the bottom, and similarly into channel 17 through a boot 20. Channels 16, 17 as well as main housing 12 are floorless, since floors are made unnecessary by the invention. Channels 16, 17 are fabricated advantageously of glavanized welded iron plate, sheet metal, cast or sheet plastic or other sturdy material suitable for use in a wet, harsh environment.

Figure 2:
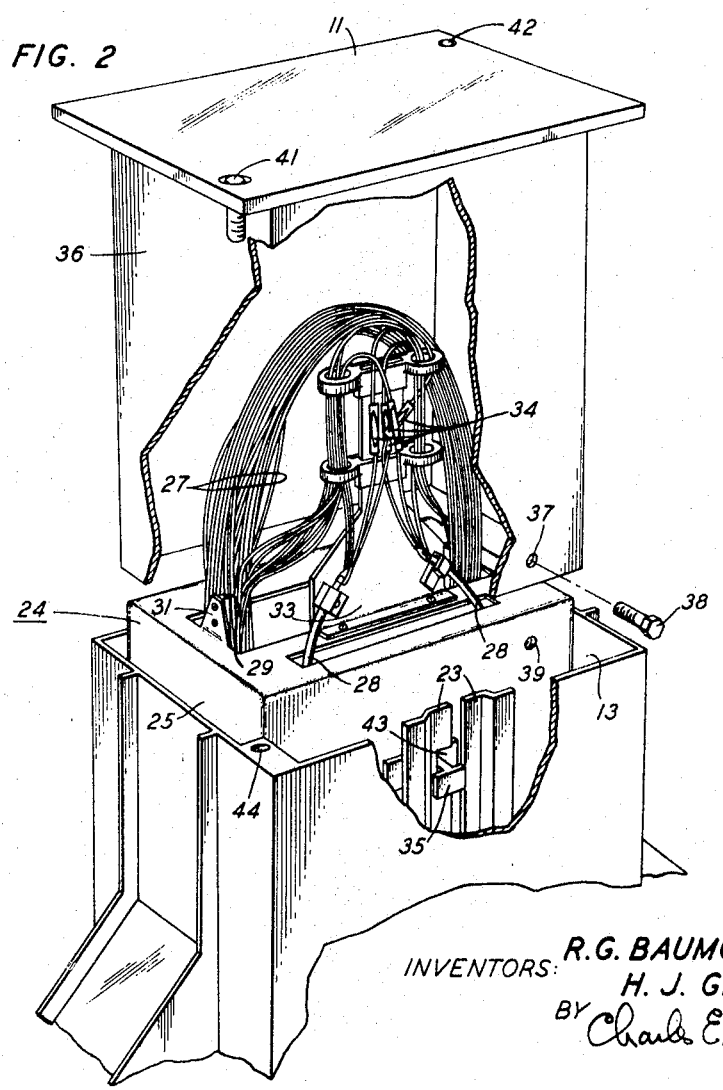
FIG. 2 is a partial side perspective view showing the interior well with moving terminal platform and bell jar cover.
Figure 3:
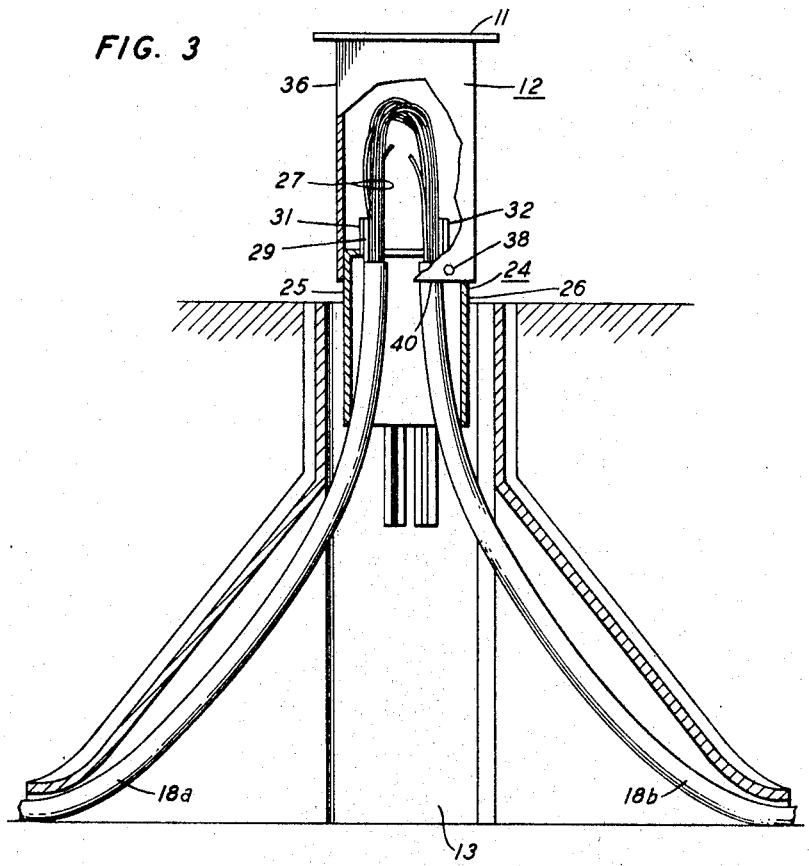
FIG. 3 is a sectional front schematic view of the closure in the open working position.

As seen in FIG. 2, the opposite sides 21, 22 of housing 12 include vertical guides 23 along their interior surfaces at about the midpoint. Guides 23 run from the top edge of interior well 13 to a point at substantially the well center, as seen in FIG. 3. These guides 23 serve as tracks for a platform 24 in which to ride in a vertical direction. Platform 24 is in effect a splice and terminal mount. In the illustration presented, the cable section 18a is led under one side 25 and the cable section 18b is led under the opposite side 26 of platform 24. A portion of the cable outer jacketing is removed to expose conductors 27 for splicing certain ones thereof to underground drop wires such as 28 which may lead to a residence.

Metal grounding bars 29, 30 are secured in conventional fashion to the conductive inner sheath (not shown) of cable sections 18a, 18b. A sealing epoxy or the like is forced into the cable sections 18a, 18b where the exposed conductors exit from the sections, to further secure bar 29 and seal the cable interior from moisture. The bars 29, 30 then are secured to extensions 31, 32 of platform 24. A terminal or splice post 33 raising from platform 24 serves as an anchor to support the conductors 27 as well as to support the splices illustrated at 34 which are made to drop wires 28.

Platform 24 includes tabs 35 which ride in the guides 23 to steady the platform within the well 13. The guides 23 include near their top an indentation 43 on one side, in which the tabs fit so as to support the platform in a raised position.

A watertight bell jar type cover 36, including the top 11, as its upper surface, fits over the splice post 33 and over platform 24 as seen in FIG. 2. When in place, as in FIG. 3, cover 36 acts to exclude all water from the critical splice volume which it encloses. Cover 36 is secured to platform 24 for example by bolting it through hole 37 with bolt 38 into threads 39. As seen in FIG. 3, the bottom edge 40 of cover 36 when it is in place is lower than the exposed epoxy seal; and also lower, of course, than the splice areas.

Access to closure 10 is gained by unbolting top 11 at 41, 42 from threaded holes, for example hole 44 in the top edge of housing 12 and then lifting up on top 11. This raises cover 36, platform 24 attached thereto and cable sections 18a, 18b. Platform 24 is engaged in its raised position by tabs 35 and indentations 43. The cable sections 18a, 18b rise without bending significantly. No conductors are subject to bending. Any water that may be present in interior well 13 is of no consequence; it has been prevented entry to the critical points by cover 36. Further, as the platform 24 is above ground level, it also almost always is above any water level present in the environment. Removal of cover 36 at this time is safe and simple.

Figure 4:
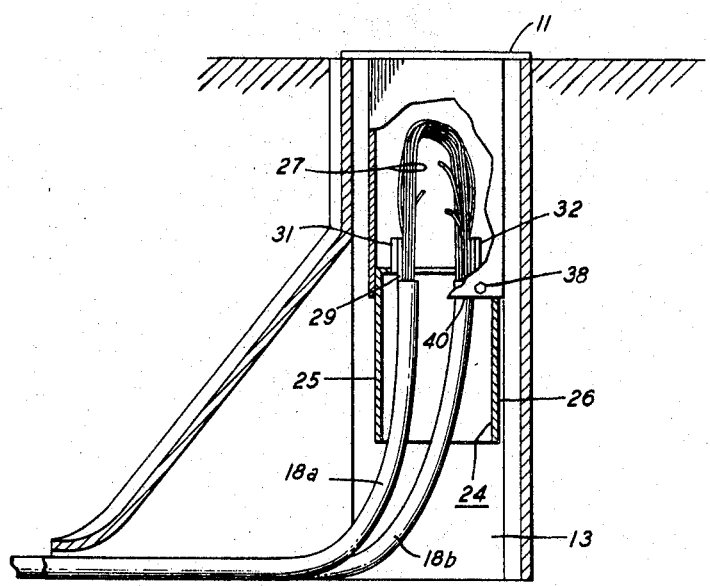
FIG. 4 is a sectional front schematic view of a one-entrance closure in the closed ground level position.

Once work is completed in the splice area, cover 36 is re-attached to platform 24 and the assembly is lowered. The cables give way again within their channels 16, 17 as depicted in FIG. 4. The water present, if any, need not even be pumped out, since the bell jar effect of cover 36 will displace it from the volume which cover 36 will occupy. Finally, the top 11 is secured again to the top edge of housing 12.

A variation on the inventive concept is shown in FIG. 4 and involves leading cable sections 18a, 18b into housing 12 from the same channel, such as 16. This arrangement is useful wherever the cable path or economics require a departure from the opposite winged structure in FIG. 1. In such case, channel 17 would not be necessary and the vertical well 13 would not include an opening on the channelless side.

What is claimed is:
1. An underground cable closure comprising:
   a well with an open mouth,
   a platform comprising a rectangular floor and plural downwardly extending sides,
   tracks for guidably mounting said platform for vertical movement within said well,
   bell jar means having vertical sides and a horizontal top with outwardly-extending flanges for covering engagement with said well mouth, and
   means for fastening said bell jar to said platform, accessible only when said platform floor is substantially level with said well mouth.

2. Apparatus in accordance with claim 1, wherein said closure further comprises at least one enclosure narrower than the well width, with an elongated entrance opening vertically onto the lower region of said well, and a roof extending downwardly and outwardly from said well, the bottom of said well and of said enclosure being substantially coplanar.

3. Apparatus in accordance with claim 2, wherein said platform further comprises a floor with openings therein through which to receive cable conductors, a terminal post mounted on said floor for supporting said conductors, said plurality of sides extending downwardly from said floor forming a chamber for leading cable from the enclosure to said platform, and means for fastening said cable to said platform in substantially parallel relation to said platform sides.

4. Apparatus in accordance with claim 2, wherein said tracks comprise a pair of vertical guide rails affixed on opposite sides of said well and extending substantially from said well mouth to a point marginally below the topmost portion of said enclosure opening; and wherein two of said platform sides each further comprise tab extensions mounted adjacent said floor for engaging the respective tracks, said tracks further including indentations for receiving said tabs to provide support for said platform only after the latter has been raised sufficiently to render said fastening means accessible.

References Cited

UNITED STATES PATENTS

| | | |
|---|---|---|
| 724,383 | 3/1903 | Donaldson. |
| 2,916,539 | 12/1959 | Hamilton _____ 174—38 |
| 3,173,987 | 3/1965 | Potruch _____ 174—38 X |

FOREIGN PATENTS

| | | |
|---|---|---|
| 867,845 | 9/1941 | France. |
| 699,502 | 11/1940 | Germany. |
| 823,508 | 11/1949 | Great Britain. |

LARAMIE E. ASKIN, Primary Examiner

U.S. Cl. X.R.

174—60